United States Patent
Pollmeier

[11] 3,891,904
[45] June 24, 1975

[54] METHODS AND CIRCUIT ARRANGEMENTS FOR SMOOTHING PULSATING VOLTAGES

[75] Inventor: Werner Pollmeier, Verl, Germany

[73] Assignee: Nixdorf Computer AG, Paderborn, Germany

[22] Filed: Nov. 23, 1973

[21] Appl. No.: 418,237

[30] Foreign Application Priority Data
Nov. 24, 1972 Germany............................ 2257713

[52] U.S. Cl................................. 318/254; 318/138
[51] Int. Cl. ............................................. H02k 29/00
[58] Field of Search ............ 307/105; 318/138, 254; 321/9 R, 10; 323/16, 19, 22 T, 25

[56] References Cited
UNITED STATES PATENTS

| | | | |
|---|---|---|---|
| 3,541,408 | 11/1970 | Schwendtner et al. ............ | 318/138 |
| 3,652,909 | 3/1972 | Rainer et al. .................... | 318/138 X |
| 3,716,769 | 2/1973 | Brunner......................... | 318/138 X |
| 3,757,185 | 9/1973 | Brunner et al................. | 318/138 X |

Primary Examiner—A. D. Pellinen
Attorney, Agent, or Firm—Woodhams, Blanchard and Flynn

[57] ABSTRACT

A method and circuit arrangement for smoothing pulsating voltages derived from more than two mutually decoupled alternating voltage components which are fed to a common load and which have at least approximately equal peak values and differ in phase position. The phase difference is less than 180° between alternating voltage components which are adjacent in respect of their phase positions. The method includes combining in pairs alternating voltage components which are adjacent in respect of their phase positions, limiting the peak values of the alternating voltage components to the peak values of the summation voltages obtained by combination, and also feeding the summation voltages, uncoupled, to the common load.

13 Claims, 4 Drawing Figures

METHODS AND CIRCUIT ARRANGEMENTS FOR SMOOTHING PULSATING VOLTAGES

FIELD OF THE INVENTION

This invention relates to methods and circuit arrangements for smoothing pulsating voltages and more specifically to methods and circuit arrangements for smoothing pulsating voltages which are formed from more than two alternating voltage components which are mutually independent, are fed to a common load resistance, have at least approximately corresponding peak values and differ in phase position, with a phase difference of less than 180° between alternating voltage components which are adjacent in respect of their phase positions. Although not limited to its application thereto, the invention is advantageously applicable to and is mainly intended for arrangements in which the said alternating voltage components are voltages derived from the stator windings of a commutatorless d.c. motor and are used for controlling the movements thereof.

BACKGROUND OF THE INVENTION

It is, of course, well known to smooth pulsating direct current voltages by means of electrical energy storing elements, i.e. inductances and/or capacitances. However, in many cases, smoothing with the aid of such elements is undesirable, mainly because, when switching on or off, or during other operational circuit changes, the time constants of such storing elements are the cause of harmful effects on the characteristics of the smoothed voltage during the switching or other changes and are liable, therefore, adversely to affect the load switched on. This type of defect is apt to be particularly troublesome in arrangements which include motors or electrical machines, because these execute mechanical movements that may be disturbed by irregularities in the voltages fed thereto. In many cases, such for example, in the case of electric motor drives for positioning printing heads in printers, for producing step-by-step movements in magnetic tape devices, or for effecting synchronisation of various machines, highly accurate and precisely controlled movements of the motors are necessary and energy storing reactive smoothing circuits are not suitable in such cases because of disturbances which occur during switching and circuit changes.

Commutatorless d.c. motors are widely used for precision drives. A motor of this type has a permanent magnet rotor and a stator consisting of several windings which are connected together at one end and have their other ends connected to a control circuit whereby current is fed to the windings in turn in such manner as to produce a rotating field to cause rotation of the motor.

It is possible to control the revolutions of a commutatorless motor of this type by utilizing the alternating voltages induced in the stator windings during their respective feed-current-free state, which voltages are revolution-dependent as regards frequency and amplitude. Such control may be obtained by feeding these alternating voltages to a common point whence, after rectification and smoothing, a voltage is obtained which is revolution-dependent and which can be compared with a reference voltage to produce a resultant of comparison which can be used to control the motor revolution.

With a known arrangement as just described and assuming the motor to have four stator windings at 90° to one another, the ripple in the pulsating direct current voltage obtained normally amounts to about 30%. With such a large amount of ripple present the motor is liable to suffer very substantial considered variations in its revolutions whenever a change in torque occurs on the motor shaft. If, in order to avoid this, the pulsating direct current voltage with its approximately 30% of ripple is smoothed by a smoothing circuit of the reactive type effecting smoothing by the action of electrical energy storing elements therein, undesired strong "overshooting" or "hunting" effects are liable to occur in the motor whenever its operation is changed and especially during starting up and during changing over to a different load. This causes inaccurate and imprecise working to a degree which is not acceptable in a great many cases e.g. in the case of precision drives.

In addition to the above-described examples of use there are numerous other known instances in which the smoothing of pulsating direct current voltages is required, without adverse time constant effects, in order to avoid interaction between energy stores and loads.

The present invention seeks to provide improved methods and means whereby ripple in pulsating voltages may be greatly reduced to smooth said voltages without incurring the defects above referred to.

According to one feature of the invention a method of smoothing pulsating voltages derived from more than two mutually decoupled alternating voltage components which are fed to a common load and which have at least approximately equal peak values and differ in phase position, with a phase difference of less than 180° between alternating voltage components which are adjacent in respect of their phase positions, said method including combining in pairs alternating voltage components which are adjacent in respect of their phase positions, approximating the peak values of the alternating voltage components to the peak values of the summation voltages obtained by combination, and also feeding the summation voltages, decoupled, to said common load.

According to another feature of this invention apparatus for carrying out a method as just set forth, comprises a source of more than two independent alternating voltage components of at least approximately equal peak values and with a phase difference of less than 180° between phase adjacent components, means for combining phase adjacent components in pairs to produce summation voltages, means for causing the summation voltages and the alternating voltage components to approximate in peak values, and a common load to which said summation voltages and said alternating components are fed.

Preferably there are four alternating voltage components with 90° phase difference between phase adjacent components.

A particularly advantageous application of the invention is to commutatorless d.c. motors, used, for example, for precision drives, in which the alternating components are voltages induced in the stator windings, when in the current-free state, of said motor by the rotation of the permanent magnet rotor of the motor.

By means of a comparator, one input circuit of which may constitute the common load, the smoothed pulsating voltage may be compared with a reference voltage to produce a control voltage which may then be used, with the aid of position responsive means responsive to the position of a source of the alternating current components, to control said source.

The invention achieves the result of producing, across the common load, a pulsating voltage in which the number of voltage maxima during a given period is twice the number produced by the original alternating voltage components. In this way there can be obtained, after rectification, a mean direct current voltage the remaining ripple in which is very substantially less than that of a pulsating direct current voltage formed from the original alternating voltage components alone. Thus, it is possible, if there are three alternating voltage components, to combine the said alternating voltage components in pairs of phase adjacent components and thus to obtain three additional summation voltages which are superimposed on the three original alternating voltage components at the common load, so that altogether a total of six voltage maxima appear. This results in an average direct current voltage with much reduced ripple. By doubling the number of voltage maxima the ripple can be reduced to about one-fourth of that which would otherwise be present.

The approximation of the peak values of the alternating voltage components to the peak values of the summation voltages is advantageously effected by voltage division of the alternating voltage components. The dimensioning of the voltage dividers used becomes especially simple the number of alternating voltage components is four and phase adjacent components have a phase difference of 90°. This is the case with most known commutatorless d.c. motors, because such motors have four mutually symmetrically arranged stator windings so that the motor will start reliably whatever may be the initial position of the permanent magnet motor rotor. The combination of the alternating voltage components in pairs to form the summation voltages is in this case (and others) advantageously effected by using an ohmic resistance network to combine phase adjacent alternating voltage components, and approximating or limiting the peak values of the alternating voltage components to the peak values of the summation voltages by voltage division by a factor ½ $\sqrt{2}$, because this factor applies also as regards the result of combining the respective alternating voltage components.

BRIEF DESCRIPTION OF THE DRAWINGS

The invention is illustrated in and further explained in connection with the accompanying drawings. These drawings illustrate and explain the invention as applied to the smoothing of a voltage which is derived from the stator windings of a commutatorless d.c. motor and is employed for controlling the revolution thereof. In the drawings.

DETAILED DESCRIPTION

Figure 1:
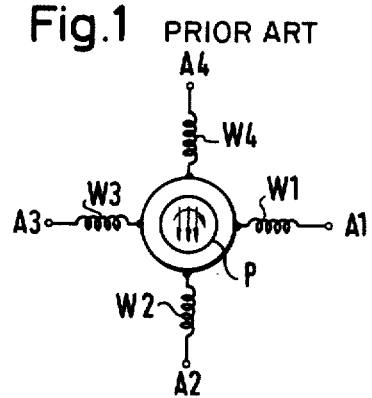
FIG. 1 is a diagrammatic representation of a commutatorless d.c. motor as known per se and having a permanent magnet rotor and a stator which has four similar symmetrically arranged stator windings at 90° to one another.

FIG. 1 represents a commutatorless d.c. motor having a permanent magnet rotor P and a stator comprising four similar individual windings W1, W2, W3 and W4 which are arranged symmetrically with adjacent windings displaced at 90° to one another. The three straight arrow-headed lines represent the permanent magnet field of the rotor and the arrow-headed curved line represents the direction of rotor rotation. The four stator windings are connected together at one end and the other ends of these windings are referenced A1, A2, A3 and A4. During operation of the motor the terminals A1, A2, A3 and A4 are connected in turn, cyclically, to a source of direct current voltage (not shown in FIG. 1) by means of a control circuit which is yet to be described and which is also not shown in FIG. 1. The stator windings produce a rotating field so that torque is exerted on the permanent magnet rotor P. During rotor rotation sinusoidal induced voltages appear on the respectively current-free windings and these voltages can be employed as voltages for control purposes. Alternatively, or as well, these voltages can be utilized for other purposes, for instance for indicating the revolutions of the motor or for the regulation of equipment associated with the motor.

Figure 2:
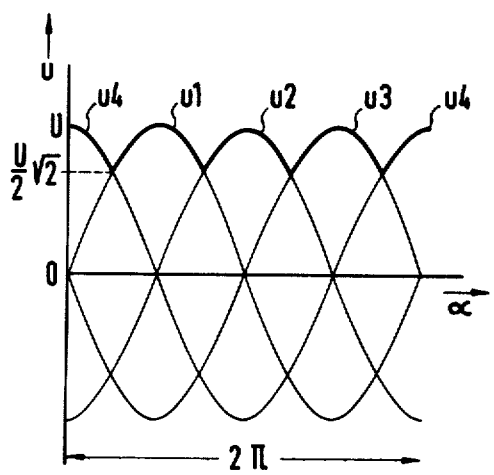
FIG. 2 is a graphical figure showing the alternating voltage components induced in the windings, when in the currentless state, by the rotation of the permanent magnet rotor.

If, as is the case in usual present day practice, the induced voltages appearing on the four component windings W1, W2, W3 and W4 are fed to a common load resistance then, assuming the windings are mutually uncoupled and independent, the voltage that will appear across this resistance will be as indicated by the continuous thick line at the top of FIG. 2, in which the separate sinusoidal curves (which are in thinner lines except where they combine to form the thick line) u1 to u4 are the voltages induced on the individual windings. The form induced sinusoidal voltages u1, u2, u3, u4 are of the same amplitude. As will be seen from the continuous thick line at the top of FIG. 2 the resulting direct current voltage which would be obtained after rectification across the common resistance would contain a very high ripple factor amounting to about 30%, because the minima of the alternating voltage components have a value close to ½ $\sqrt{2}$ if one allots a value of 1 to the maxima.

Figure 3:
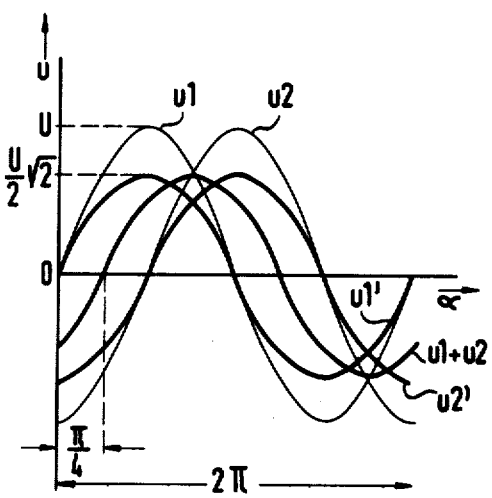
FIG. 3 is a similar graphical figure showing the nature of the improvement obtained by the present invention.

FIG. 3 shows the very considerable reduction in ripple which is obtained, in accordance with this invention, by combining or adding geometrically induced voltages which are adjacent in phase so that four summation voltages are obtained as the result of the geometrical addition of the induced alternating voltages u1 and u2, the induced alternating voltages u2 and u3, the induced alternating voltages u3 and u4, and the induced alternating voltages u4 and u1. So as not to complicate FIG. 3 unduly, only two of the induced alternating voltages, u1 and u2 are shown in FIG. 3, the summation voltage resulting from their geometrical addition being shown by the thick black curve referenced u1 + u2. It will be appreciated that since the alternating voltages u1 to u4 are induced by the movement of the permanent windings W1 to W4 they are the alternating voltage components of an alternating voltage generated by one source. If one combines these alternating voltage components by means of an adding circuit formed by equal ohmic resistances, these resistances will form a series connection with respect to said generating source, so that, with equal resistance values at the point of combination, only half the summation voltage will appear in each respective case. From the addition of the alternating voltage components $$u1 = U \sin \alpha \text{ and } u2 = U \sin (\alpha - \frac{\pi}{2})$$

we get a summation voltage $u_s$ as given by
$u_s = U = \sqrt{2} \sin (\alpha - \pi/4)$
The above described halving effect gives, accordingly, for the summation voltage $u1 + u2$ the voltage
$u1 + u2 = U/2 \; 2 \sin (\alpha - \pi/4)$.
This is the equation for the curve referenced $u1 + u2$ in FIG. 3. If, now the amplitude of the alternating voltage components $u1$ and $u2$ is brought to the value $U/2 \times \sqrt{2}$, i.e., is approximated to that of the summation voltage, the result is the alternating voltages referenced $u1'$ and $u2'$ in FIG. 3. If these voltages are applied across a common load resistance, with uncoupling present as previously described, the resultant voltage waveform will have eight peaks (maximum) instead of four per rotation of the rotor and will therefore have substantially less ripple than a waveform obtained in the known manner merely from the voltage components $u1, u2, u3, u4$. It will be seen that the points of intersection of the voltage components $u1, u2, u3, u4$ with the respectively amplitude-reduced summation voltages will occur at angular values which are phase displaced respectively by $\pm \pi/8$ relatively to the values $\alpha = 0, \pi/2, \pi, 3\pi/2, 2\pi$. By equating the functions of the mutually intersecting curves it may be shown that the amplitude value at the respective points of intersection is 0.924 so that the residual ripple has been reduced to about 7.6%.

Figure 4:
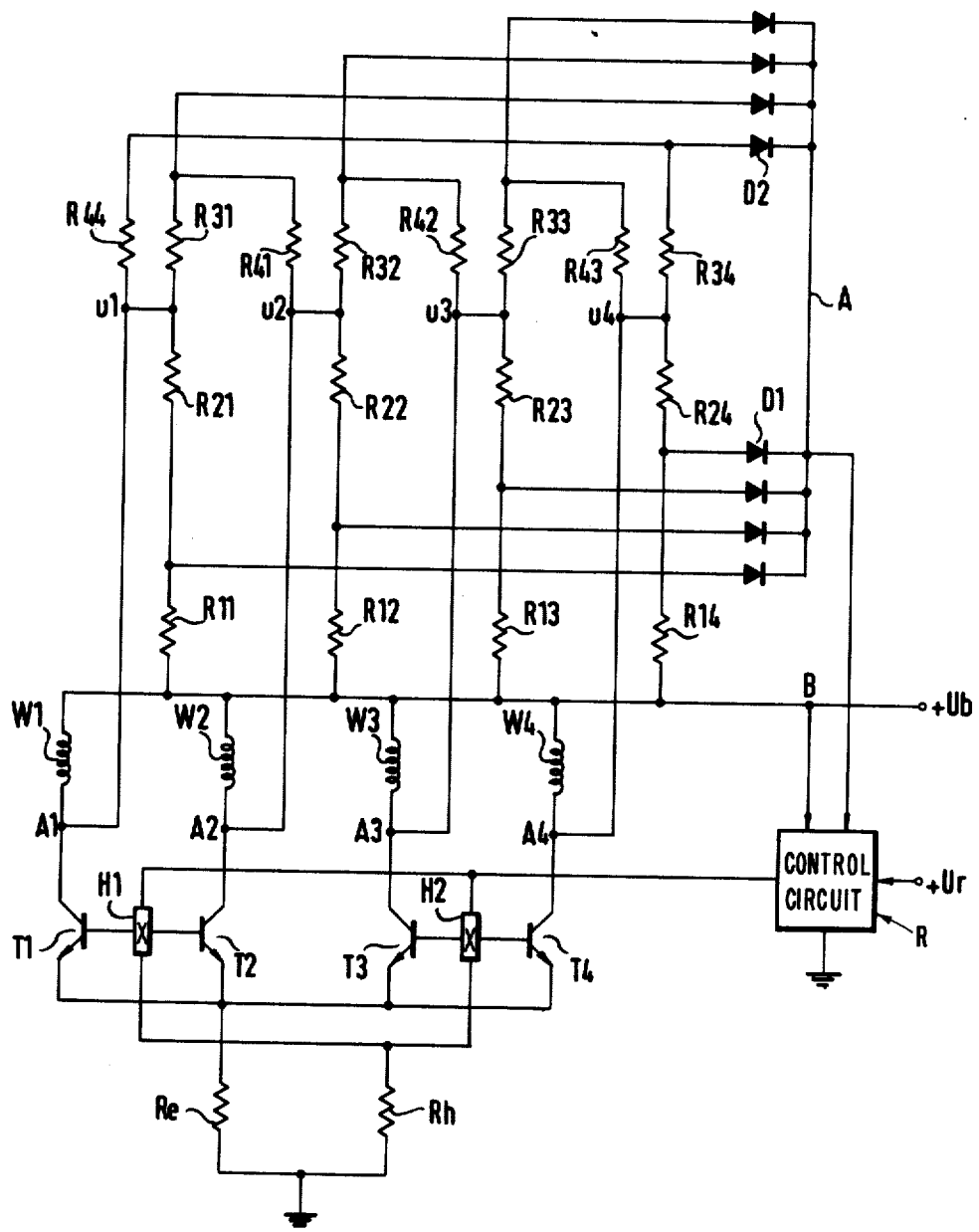
FIG. 4 shows a circuit arrangement in accordance with the invention.

FIG. 4 shows one form of circuit arrangement in accordance with this invention. In FIG. 4 the commutatorless motor of FIG. 1 is represented by its stator windings W1 to W4 the permanent magnet rotor not being shown in FIG. 4. The windings W1 to W4 are connected together at point B to which the positive terminal of a source (not shown) of D.C. potential is connected as indicated by the reference +U$b$. The direct current voltage +U$b$ is voltage relative to earth potential. The winding terminals A1 to A4 are the same as in FIG. 1 and are respectively connected to the collectors of four transistors T1 to T4 with a common emitter resistance Re one end of which is connected to earth. The transistors are connected in pairs to rotor position responder devices H1 and H2, T1 and T2 being connected to the device H1 and T3 and T4 being connected to the device H2. These responder devices may most conveniently be magnetic field interrogator devices which interrogate the magnetic flux of the permanent magnet rotor and, accordingly, are responsive to the rotor position relative to the stator windings W1 to W4. In the particular embodiment now being described the devices H1 and H2 are Hall generators arranged on two mutually adjacent component stator windings displaced by $\pi/2$ relative to one another. When the Hall generators H1 and H2, which are connected to earth via a common series resistance Rh, have a constant direct control current flowing through them and the field distribution over the rotor periphery is sinusoidal, then sinusoidally varying Hall voltages will appear on the base electrodes of the transistors T1 to T4. If the transistors T1 to T4 are operated over their linear range, their collector currents and, therefore, the magnetic fluxes generated by the component stator windings W1 to W4, will also be sinusoidal. If the Hall generators and the transistors are correctly assigned to the stator windings, the stator will produce a rotating field which produces a practically constant torque on the permanent magnet rotor P.

A respective alternating voltage component $u1$ to $u4$ may be tapped off from the stator winding terminals A1 to A4 in the current-free state of the respective stator winding. The alternating voltage components may be uncoupled and independent from one another, as known per se, by means of diodes and fed to a common circuit point at which they form an actual voltage which is proportional to the revolution of the d.c. motor. This voltage can be led to a control circuit R in which it is smoothed and compared with a reference voltage $U_r$. The control currents from the Hall generators H1 and H2 determine when the respective transistors T1 to T4 are rendered conductive. If the control current in the control circuit R is controlled in correspondence with the comparison voltage received there, then this control will affect the revolution of the d.c. motor via the Hall voltages and the transistors T1 to T4.

A resistance network arrangement formed from voltage dividers and connecting circuits is provided for smoothing the actual voltage derived from the component stator windings W1 to W4. This arrangement includes uncoupling diodes D1 and D2 through which direct current voltage is fed to the control circuit R.

More in detail, the alternating voltage components $u1, u2, u3$ and $u4$ appear at the points so referenced in FIG. 4 and are fed as shown to intermediate taps on resistance potentiometers from which reduced amplitude voltages, reduced by a factor $\frac{1}{2} \sqrt{2}$ as compared with amplitudes of $u1$ to $u4$, are fed to a common point A via diodes D1. The four potentiometers are constituted by the resistances R11, R21; R12, R22; R13, R23; and R14, R24. At the point A appear alternating voltage components such as $u1'$ and $u2'$ shown in FIG. 3, for example. The voltage dividers are connected at one end to point B where the operating voltage +U$b$ is applied.

As will be seen the alternating voltage components $u1, u2, u3, u4$ are also applied at the ends of respective pairs of equal resistances R31, R44; R32, R41; R33, R42; and R34, R43. Summation voltages of peak value $\frac{1}{2} \sqrt{2}$ times the peak value of the geometrically added alternating voltage components are thus produced and are fed to the common point A via diodes D2. There will therefore be obtained, between the point A and a point B a smoothed direct current voltage consisting of eight pulsating direct current voltage components of different phase positions, namely those of the four original voltage components and those of the four summation voltages, with both these types of voltage components generating a practically constant equal voltage value because of the approximation of their peak values. The difference in phase between respectively adjacent direct current voltage components is $\pi/4$.

A smoothed direct current voltage generated in this way has maximum and minimum values which can be regarded as respectively furnished by voltage sources of different internal resistance. Thus, the maximum values are derived from voltage sources with an effective internal resistance Ri determined by the parallel-connected resistances R11, R21; R12, R22....and so on and the resistances R31, R44; R32, R41....and so on because, at the particular instant of a maximum value, only one of these resistance arrangements is effective. On the other hand as regards the minimum values, the parallel connection of both the previously named internal resistances applies because at the instants when minima occur, both of these are effective.

The ripple factor of the smoothed direct current voltage can be reduced still further by so dimensioning the control circuit R that its input resistance, regarded as a load resistance, is such that the voltage drop across it has, as nearly as is practicable, the same value at any instant. For the resistance network shown in FIG. 4, in which the resistances R21, R31; R22, R32...and so on, are dimensioned to produce a voltage division having the factor ½ $\sqrt{2}$ and the resistances R31, R44; R32, R41...and so on are equal, the following additional relations may be computed if R1 = R11 = R12 = R13 = R14
R2 = R21 = R22 = R23 = R24
R3 = R31 = R32 = R33 = R34
R4 = R41 = R42 = R43 = R44

$$\frac{R2}{R1+R2} = \frac{1}{2}\sqrt{2} \rightarrow R_2 = \frac{R1}{\sqrt{2}-1}$$

$$\frac{R3\,R4}{R3+R4} = \frac{R1\,R2}{R1+R2} \rightarrow R3 = R4 = R1\,\sqrt{2}$$

$$Ri = \frac{R1}{2}\sqrt{2}$$

$$\frac{U1\,R5}{Ri+R5} = \frac{U1\,\sin 67.5°\,R5}{Ri_2+R5} \rightarrow R5 = 2.75\,R1\,\sqrt{2}$$

$$R5 = 3.89\,R1$$

By dimensioning the internal input resistance R5 of the control circuit R to comply with the foregoing, there is obtained an additional approximation of the minimum and maximum values of the smoothed direct current voltage to one another, with the result that the above mentioned theoretical value of residual ripple of about 7.6% is reduced by (approximately) one-half, i.e., to around 4%.

The invention is not limited to the particular circuitry shown in FIG. 4. In place of the described resistance network arrangements therein shown, other circuits or networks, known per se for the combination of alternating voltage components can be used. In dependence on the nature of the alternating voltage components to be combined such circuits or networks can be reactive and contain inductive and/or capacitative elements. For example, transformers or transducers for representing, dividing and adding alternating current components of different phase positions can be used. Also, the invention is not limited to its application to arrangements, such as the motor arrangement illustrated, which include mechanically moving elements, for it can be applied in similar manner to the smoothing of pulsating voltages generated in other ways.

I claim:

1. A method for smoothing pulsating voltages derived from more than two mutually independent alternating voltage components having generally equal peak-to-peak values and having a difference in phase less than 180° between adjacent phase components, comprising the steps of:

limiting the peak value of each of said independent alternating voltage components and producing limited values of said independent alternating voltage components;

combining the phase adjacent components of said independent alternating voltage components in pairs and producing alternating summation values; and rectifying and summing said limited values of said phase adjacent independent alternating voltage components and said alternating summation values whereby twice as many alternating voltage components are summed during said summing step as come from said source so that the amount of ripple in a total rectified summation voltage component is minimized.

2. A method according to claim 1, wherein there are four alternating voltage components derived from a common generating source and at 90° phase difference between phase adjacent alternating voltage components, the summation voltage components being obtained by means of ohmic resistance circuits which combine phase adjacent voltage components in said pairs, the peak values of the alternating voltage components being limited to the peak values of the summation voltage components by voltage divider circuits and by a factor of substantially $\sqrt{2}/2$.

3. A method according to claim 2, wherein a load is dimensioned to have a value which is determined in accordance with the circuit values of said voltage divider circuits, whereby the peak values of the alternating voltages and the summation voltage components are made to approximate to one another, and which is such that the voltage drop across the said load remains substantially the same at all times.

4. A method according to claim 1, wherein the said alternating voltage components are voltages induced in the stator windings of a brushless motor when in the current-free condition, by the rotation of a permanent magnet rotor forming part of said motor.

5. A method according to claim 1, wherein the smoothed pulsating voltage is compared with a reference voltage to produce a control voltage which is employed to control a source producing said alternating voltage components.

6. An apparatus for smoothing pulsating voltages, comprising:

means defining a source of more than two independent and phase shifted alternating voltage components having generally equal peak-to-peak values and having a difference in phase less than 180° between adjacent phase components;

means for limiting the peak value of each of said independent alternating voltage components and producing limited values of said independent alternating voltage components;

means for combining the phase adjacent components of said independent alternating voltage components in pairs and producing alternating summation values; and means for rectifying and summing said limited values of said phase adjacent independent alternating voltage components and said alternating summation values, whereby twice as many alternating voltage components are summed at said summing means as come from said source means so that the amount of ripple in a total rectified voltage component from said summing means is minimized.

7. An apparatus according to claim 6, wherein said limiting means includes a resistance network.

8. An apparatus according to claim 7, wherein said source means produces four alternating voltage components with the mutually adjacent components being phase shifted 90° from each other.

9. An apparatus according to claim 8, wherein said source means includes stator windings on a brushless direct current motor having a permanent magnet rotor and interrogator means for producing a signal responsive to the position of said rotor relative to said stator windings.

10. An apparatus according to claim 9, including a comparator circuit responsive to said total rectified voltage component and a reference voltage and means for connecting said comparator circuit to said interrogator means to control the time at which the magnetic flux of said permanent magnet rotor is interrogated.

11. An apparatus according to claim 10, wherein said interrogator means comprises two pair of transistors, one of the collector and emitter electrodes of each transistor being connected to one end of a stator winding so that each of said four stator windings has one of said transistors connected in circuit therewith and generator means connected to the base electrode of each of said transistors, said generator means being positioned adjacent said stator windings to detect the position of said permanent magnet relative thereto and producing a signal indicative of the position of said permanent magnet rotor relative to said stator windings.

12. An apparatus according to claim 11, wherein said generator means are Hall generators.

13. An apparatus for smoothing pulsating voltages, comprising:

means defining a source of more than two independent phase shifted alternating voltage components having generally equal peak-to-peak values and having a difference in phase less than 180° between adjacent phase components;

means for limiting the peak value of each of said independent alternating voltage components and producing limited values of said independent alternating voltage components, said limiting means including a resistance network having a plurality of equal ohmic resistances;

means for combining the phase adjacent components of said independent alternating voltage components in pairs and producing alternating summation values;

means for rectifying and summing said limited values of said phase adjacent independent alternating voltage components and said alternating summation values, whereby twice as many alternating voltage components are summed at said summing means as come from said source means so that the amount of ripple in a total rectified voltage component from said summing means is minimized, said rectifying and summing means including a plurality of first diodes for rectifying said limited values of said phase adjacent independent alternating voltage components and a plurality of second diodes for rectifying said alternating summation values, the output terminals of all of said diodes being connected together; and load means responsive to said total rectified and smoothed voltage component.

* * * * *